Dec. 15, 1936.  A. M. TYSON  2,064,702
SHOCK ABSORBER
Filed Nov. 2, 1935   2 Sheets-Sheet 1
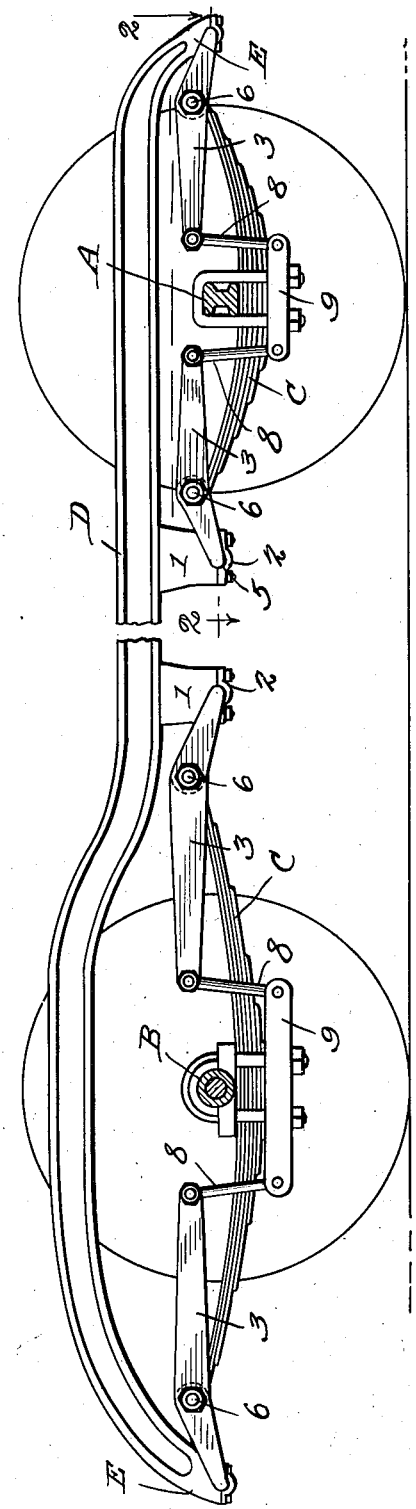
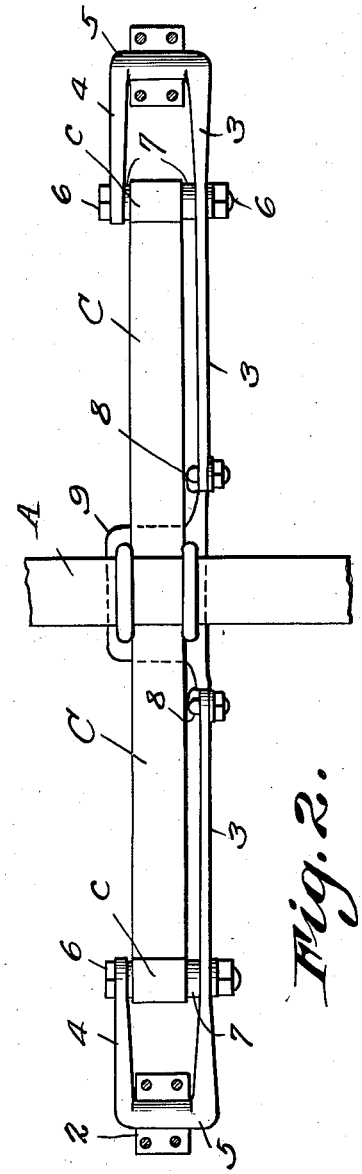
Inventor
A. M. Tyson
By C. A. Snow & Co.
Attorneys.

Dec. 15, 1936.  A. M. TYSON  2,064,702
SHOCK ABSORBER
Filed Nov. 2, 1935  2 Sheets-Sheet 2
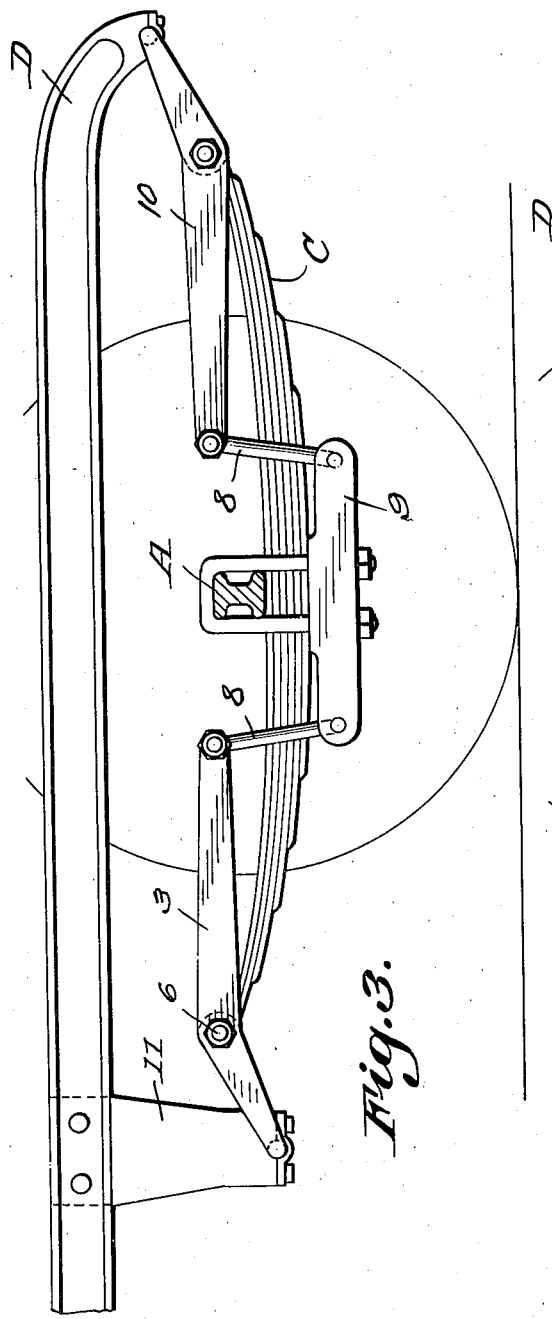
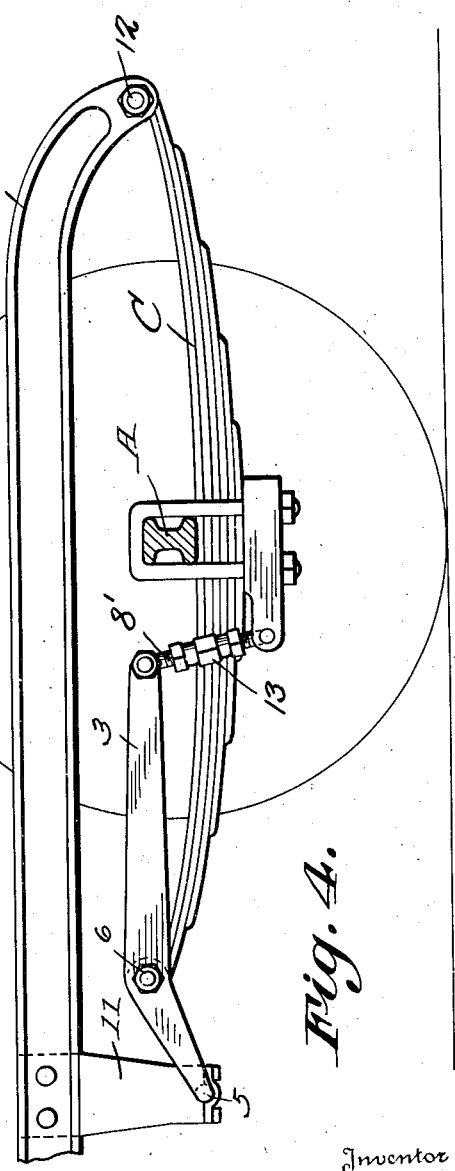
Inventor
A. M. Tyson
By C. A. Snow & Co.
Attorneys.

Patented Dec. 15, 1936

2,064,702

UNITED STATES PATENT OFFICE 2,064,702

SHOCK ABSORBER

Archie M. Tyson, Dallas, Tex.

Application November 2, 1935, Serial No. 48,010

1 Claim. (Cl. 267—19)

This invention relates to a shock absorber for vehicles, an object being to provide a novel arrangement of levers and links which when connected properly to the springs, axles and chassis, will act to absorb shocks due to either abrupt upward or downward movements of the axle.

Another object is to provide a built-in shock absorber which will eliminate lateral shifting of the springs and also allow the body of the car to travel smoothly and well balanced, the same beneficial results being obtained as where the so-called "knee action" is employed in vehicle constructions.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a view partly in section and partly in elevation of a portion of an automobile equipped with the present improvements.

Figure 2 is a view of one of the springs and the parts associated therewith, taken on line 2—2, Figure 1.

Figure 3 is a side elevation of a slightly modified form of shock absorber.

Figure 4 is a similar view of another form.

Referring to the figures by characters of reference, A and B designate the front and rear axles respectively of a vehicle and a laminated spring C is extended under and fastened in the usual manner to each axle. The chassis has been indicated at D and has downturned ends E while depending from and fixedly secured to the side of the chassis and between the axles are hangers 1 having bearings 2.

Each spring C has terminal sleeves c and each sleeve is seated between the long arm 3 and the short arm 4 of a yoke 5 journaled in one of the bearings 2. A pivot bolt 6 extends through the arms and the sleeve and can be provided with suitable spacers 7, as shown.

The long arms 3 constitute levers and as the yokes associated with each spring are oppositely disposed, these levers are extended toward each other. They are provided at their free ends with pivoted links 8 which constitute hangers for connecting them to the clamping plate 9 forming a part of the means employed for fastening the spring to its axle.

It will be apparent that by connecting the axle, spring and chassis by the means disclosed the strain upon the spring will be materially reduced without lessening the efficiency of the device as a shock absorber, and because of the "prying" effect of the levers upon the ends of the springs, the body will be better balanced and run more smoothly over an uneven road surface than would be possible otherwise. Furthermore by providing the lever and link connection at each end of the spring the axle will have a straight up and down movement relative to the body, this being advantageous in steering and also because it reduces wear upon the tire treads.

In Figure 1 each lever 3 is angular with its end portions diverging downwardly so that the chassis can be supported close to the axles. Under some conditions, however, the front levers can have their end portions diverging upwardly as shown at 10 in Figure 3 while the other levers can be arranged substantially as in Figure 1 but with a longer hanger 11. This arrangement is for a chassis to be supported well above the axles and as the short arms of the two levers are extended along parallel lines above and below the spring respectively, the several parts can have relative movement without tending to push the ends of the spring toward each other.

In Figure 4 the front levers are eliminated and each front spring C connected directly to the chassis as shown at 12. The back lever with it connections are retained however. This allows a slight backward movement of the axle when an obstruction is hit.

If desired one or more of the links 8 of each spring can be made adjustable to compensate for any weakening and consequent sagging of the spring. In Figure 4, for example the link 8' can be made of sections joined by a turnbuckle 13. Obviously the same arrangement can be employed in the other forms.

It is to be understood that if necessary, the connection between the spring and its yoke or yokes in each form shown can be such as to allow a play or lost motion sufficient to compensate for the extension or expansion of the spring when in action.

What is claimed is:

The combination with an axle, a spring, means for fastening the spring between its ends to the axle, and a chassis, of yokes pivotally connected to the chassis and straddling the respective ends of the spring, said yokes being extended along substantially parallel lines and in opposite directions respectively away from the spring, means for pivotally and detachably connecting the yokes to the spring, each yoke having a long arm constituting a lever, and a link connection between each lever and the spring fastening means.

ARCHIE M. TYSON.